United States Patent [19]
Brown, Jr.

[11] Patent Number: 6,158,555
[45] Date of Patent: Dec. 12, 2000

[54] APPARATUS AND METHOD FOR CARRYING WIRES ALONG A VEHICLE-MOUNTED EXTENSIBLE MAST

[76] Inventor: James M. Brown, Jr., 1924 Saxon Blvd., Deltona, Fla. 32725

[21] Appl. No.: 09/292,894

[22] Filed: Apr. 16, 1999

[51] Int. Cl.[7] ....................................................... B66B 7/06
[52] U.S. Cl. ........................... 187/414; 138/120; 248/49; 248/68.1; 59/78.1
[58] Field of Search ........................... 187/240, 242–244, 187/250, 272, 311, 312, 414; 254/337; 138/110, 120; 414/918; 248/53, 68.1, 70, 49, 219.2, 161, 157; 348/144, 148; 59/78.1

[56] References Cited

U.S. PATENT DOCUMENTS

| | | | |
|---|---|---|---|
| 1,435,311 | 11/1922 | Knight | 138/110 |
| 4,896,748 | 1/1990 | Mikkelsen et al. | |
| 4,913,458 | 4/1990 | Hamilton | 280/6.135 |
| 5,218,375 | 6/1993 | Hillman | |
| 5,421,371 | 6/1995 | Lauer | 138/110 |
| 5,434,614 | 7/1995 | Dainty | 348/144 X |
| 5,638,672 | 6/1997 | Furukawa | 248/49 X |
| 5,711,733 | 1/1998 | Blase | 474/227 |
| 5,860,274 | 1/1999 | Saleh et al. | 248/49 X |

FOREIGN PATENT DOCUMENTS

| | | |
|---|---|---|
| 3431531 A1 | 3/1986 | Germany. |
| 3806400 A1 | 9/1989 | Germany. |
| 298 06 969 U1 | 6/1998 | Germany. |

OTHER PUBLICATIONS

*Machine Design* Aug. 21, 1997 Simple Flip Give Cable Carrier New Job article reprint with adjunct igus® advertisement.

*Primary Examiner*—Robert P. Olszewski
*Assistant Examiner*—Thuy V. Tran
*Attorney, Agent, or Firm*—Paul S. Rooy

[57] ABSTRACT

A method and apparatus for carrying wires along a vehicle-mounted extensible mast. Said apparatus comprises a telescopically extensible mast and a wire carrier box mounted to a vehicle, a masthead platform mounted to an extreme of the mast opposite the vehicle, a bend-reversible wire carrier, and guides attached to the mast. The bend-reversible wire carrier is threaded through the guides. One extreme of the bend-reversible wire carrier is attached to the vehicle, and the opposite extreme is attached to the masthead platform. The bend-reversible wire carrier comprises clockwise bends alternating with counterclockwise bends separated by bend-reversible wire carrier sections. The bend-reversible wire carrier sections, clockwise bends, and counterclockwise bends are sized to fit into the wire carrier box when the mast is retracted. The method includes the steps of sizing the bend-reversible wire carrier sections, clockwise bends, and counterclockwise bends to fit into the wire carrier box, laying wire into the bend-reversible wire carrier, attaching one end of the bend-reversible wire carrier to the vehicle, threading the bend-reversible wire carrier through the guides, and attaching an end of the bend-reversible wire carrier opposite the vehicle to the masthead platform. A heating means and bend-reversible wire carrier cover are also disclosed.

13 Claims, 7 Drawing Sheets

APPARATUS AND METHOD FOR CARRYING WIRES ALONG A VEHICLE-MOUNTED EXTENSIBLE MAST

BACKGROUND OF THE INVENTION

1. Field of the Invention

This invention relates to vehicle-mounted extensible masts, and in particular to an apparatus and method for carrying wires along a vehicle-mounted extensible mast.

2. Background of the Invention

A number of vehicles currently carry extensible masts, which typically range in extended length from 30 to 58 feet. Such vehicles include electronic news-gathering vans, satellite news vehicles, electronic field-production vehicles, production trailers, military vehicles, mobile automatic teller machine vehicles, medical trailers, and boats, to name a few. The types of apparati mounted on the tops of the vehicle-mounted extensible masts include microwave transmitters and receivers, cameras, lights, RFD frequency antennas, cell phone antennas, scanner antennas, weather instruments, and in the future, satellite antennas. Communication means must be provided back and forth from the vehicle below and the antennas above to provide power, to send antenna and camera aiming instructions, to transmit data, etc.

Existing Designs

The most prevalent communication means currently available is the coiled tube. Referring now to FIG. 1, we observe vehicle 2 with extensible mast 4 mounted to it. Typically the lowest section of mast 4 passes through the vehicle 2 roof and through its cabin, and is securely anchored to the frame of vehicle 2. The mast 4 depicted in FIG. 1 comprises 8 sections: the lowest section anchored to vehicle 2 previously mentioned, and seven additional sections telescopically extensible relative to the lowest section. Thus, in practice, an eight-section antenna whose collapsed length is only approximately seven feet, measures 58 feet in length when fully extended!

Extensible jacks 7 are provided to stabilize vehicle 2 when mast 4 is extended, and an engine kill switch prevents vehicle 2 from moving under its own power if mast 4 is even slightly extended. Vehicle 2 should not be moved if mast 4 is extended due to a number of hazards, including overhead power distribution lines, bridges, and vehicle 2 instability. Control panel 16 is generally mounted to the exterior of vehicle 2, and affords control of the extension and retraction of mast 4, as well as of extensible jacks 7.

FIG. 1 depicts a fairly common equipment configuration mounted to masthead platform 5: camera 6, microwave dish antenna 8, and RF pancake antenna 10. Lights (not shown) would normally be provided to illuminate masthead platform 5 at night, as well as to warn low-flying aircraft.

The communication means between vehicle 2 and the platform 5 equipment depicted in FIG. 1 is coiled tube 12. Coiled tube 12 is stuffed with wires to provide the communication functions required, and is coiled loosely around mast 4 like a lazy boa constrictor. A lower extreme of coiled tube 12 is attached to vehicle 2, and an opposite, upper extreme of coiled tube 12 is attached to masthead platform 5.

In operation, coiled tube 12 resembles a giant "Slinky" spring. In the case of a 58-foot mast, coiled tube 12 would measure approximately 80 feet if pulled straight. The extended length of coiled tube 12 measures up to 58 feet. In its collapsed position, coiled tube 12 retracts into basket 14, which is disposed around mast 4 and attached to the roof of vehicle 2. When viewed from the top, basket 14 is shaped like an annulus having an outside diameter of approximately three feet, and is approximately two feet high.

Currently available coiled tubes 12 are manufactured of resilient synthetic material such as nylon. Consequently coiled tube 12 possesses material memory which urges it to remain in its coiled shape, and to retract if not forcibly extended. Thus, when mast 4 is retracted, both the material memory inherent in coiled tube 12 and gravity help retract coiled tube 12 into basket 14.

The thickness and number of wires which must be stuffed into coiled tube 12 vary depending on the nature of the equipment installed on masthead platform 5. Depending on the thickness of the individual wires, a maximum of approximately 60 wires will fit into a standard 1¼-inch diameter coiled tube 12.

The currently available coiled-tube 12 systems suffer from a number of disadvantages. The first group of problems stem from the length of coiled tube 12 required. As previously mentioned, an 80-foot length of coiled tube 12 is required in the case of a 58-foot mast—this amounts to a coiled tube 12 which is 12 feet longer than the mast itself. The wasted coiled tube 12 material is only the tip of the iceberg: considering that wire may cost $9–$10 per foot, the waste in material using the current coiled tube method is considerable: the excess cost is at least 20 percent in material alone. This wasted coiled tube 12 material problem is exacerbated by the fact that currently available coiled tube 12 is only sold in 100-foot lengths—thus 20 feet must be lopped off and discarded right from the start to yield an 80-foot useable length.

Another series of problems with the coiled-tube 12 method stems from the difficulty of stuffing wire into coiled tube 12. First, coiled tube 12 must be straightened out. This is accomplished by immobilizing one extreme, and pulling on the opposite extreme using a forklift or truck. Approximately 500 pounds of force must be applied (and maintained) to pull (and maintain) coiled tube 12 straight. Once coiled tube 12 is straight, the individual wires to be installed are combed straight and spiral-taped together into a bundle, a leader line such as fishtape is threaded through coiled tube 12, soapy wire lubrication is slathered onto the wire bundle, and the wire bundle is pulled through coiled tube 12. This wire pulling step is fraught with peril: if even one wire breaks, the wire bundle must be pulled out of coiled tube 12, the offending wire must be removed, the wire bundle must be re-assembled, and the soapy-wire-pulling step repeated. The entire process of stuffing coiled tube 12 typically takes three men approximately four hours to accomplish. The difficulty and riskiness of this process renders it expensive: a stuffed coiled tube 12 costs approximately $2,200.

The difficulty of stuffing coiled tube 12 emphasizes the capacity problem. There are some configurations of wire bundle which a client may desire which are simply too bulky to install in coiled tube 12.

Another problem inherent in the stuffed coiled tube 12 scheme is lack of flexibility. It is not uncommon for a client to request a wire-bundle configuration change in the midst of installation. When this occurs, the entire stuffing process must be repeated.

This lack of flexibility also comes into play during maintenance: if one wire housed within coiled tube 12 were to break, the entire wire bundle must be removed, serviced, and re-installed. Because this maintenance is not typically performed in the field, such wire breakage results in downtime for the vehicle, which can be quite costly, especially during television "sweep" weeks (or during a Superbowl game broadcast, for that matter).

It is fairly common to re-configure a vehicle for a different function. For example, some vehicles are dual-use: they are used both as transmitters and repeaters. If such change in function requires a change of wire bundle, then the masthead platform 5 must be removed in order to swap stuffed coiled tubes 12. Similarly, if the equipment configuration on platform 5 is changed so as to necessitate altering the configuration of the wire bundle, then the mast head platform 5 must be removed in order to swap stuffed coiled tubes 12 (or to reconfigure the wire bundle within the existing coiled tube 12). This process is time consuming, and thus expensive.

As previously mentioned, the length of coiled tube 12 required under the present method is approximately 20 percent longer than the mast it serves. The longer the wire, the greater the voltage drop. Thus, more power (and fuel) is required to transmit signals over 80 feet than 58 feet, leading to energy waste.

When coiled tube 12 is extended by mast 4, not only must force be applied longitudinally to coiled tube 12, but mast 4 is also subjected to considerable twisting moment by coiled tube 12. The combination of coiled-tube longitudinal spring-force, twisting moment, and weight (approximately 85 lbs. for a stuffed 80-foot coiled tube 12) subject mast 4 to substantial wear-and-tear. This wear-and-tear reduces the life of mast components such as seals, keys, and keyways. Needless to say, replacement communication vehicle masts are not cheap.

Another problem with coiled tube 12 is its low service life: currently available coiled tube 12 lasts only a few years. Therefore, it must be replaced (at a cost of around $2,200) every few years.

The coiled-tube 12 method requires an annular basket 14 to store coiled tube 12 when mast 4 is retracted. Basket 14 is generally mounted to the roof of the vehicle, and measures approximately three feet in diameter and two feet in height. Because of its proportions and generous footprint, platform 5 is generally disposed atop basket 14 when retracted, with its equipment still higher. From an overhead clearance point of view, as well as from an aesthetics point of view, this scheme is problematic.

Finally, although coiled tube 12 has been previously analogized to a lazy snake, during extension and retraction it can become a snarling beast, creating tangles by hanging up on itself while extending. Such tangles increase stress on mast 4, and may reduce the life of coiled tube 12 and its wire bundle through over-extension.

SUMMARY OF THE INVENTION

Accordingly, it is an object of the present invention to provide an apparatus and method for carrying wires along a vehicle-mounted extensible mast which provides easy and reliable wire stuffing. Design features allowing this object to be accomplished include a bend-reversible wire carrier having opposing beams which define a wire aperture. Advantages associated with the accomplishment of this object include reduced assembly cost and less wasted material due to wire breakage, as well as increased responsiveness to customer-ordered changes in the wire bundle.

It is another object of the present invention to provide an apparatus and method for carrying wires along a vehicle-mounted extensible mast which accommodates more wire than a conventional coiled tube. Design features allowing this object to be accomplished include a bend-reversible wire carrier having opposing beams which define a wire aperture. Benefits associated with the accomplishment of this object include increased flexibility in wiring bundle configuration, and hence the ability to accommodate more masthead platform-equipment configurations.

It is still another object of this invention to provide an apparatus and method for carrying wires along a vehicle-mounted extensible mast which provides a shorter wire carrier than a conventional coiled tube design. Design features enabling the accomplishment of this object include a bend-reversible wire carrier with alternating clockwise and counterclockwise bends. Advantages associated with the realization of this object include reduced wire carrier length along with associated cost reduction, and reduced wire length along with the associated reduction in cost and voltage drop over its length.

It is another object of the present invention to provide an apparatus and method for carrying wires along a vehicle-mounted extensible mast which provides a wire carrier which does not exert a twisting moment on its mast. Design features allowing this object to be accomplished include a bend-reversible wire carrier with alternating clockwise and counterclockwise bends. Benefits associated with the accomplishment of this object include increased mast life, with associated cost savings.

It is still another object of this invention to provide an apparatus and method for carrying wires along a vehicle-mounted extensible mast which provides for easily maintenance. Design features enabling the accomplishment of this object include replaceable links. Advantages associated with the realization of this object include increased maintainability, and hence decreased maintenance costs.

It is another object of the present invention to provide an apparatus and method for carrying wires along a vehicle-mounted extensible mast which is aesthetically pleasing. Design features allowing this object to be accomplished include a bend-reversible wire carrier which retracts neatly into a wire carrier box. Benefits associated with the accomplishment of this object include a more pleasing appearance, and the provision of a flat surface which may be used for decorative and/or advertising purposes.

It is still another object of this invention to provide an apparatus and method for carrying wires along a vehicle-mounted extensible mast which provides quick and easy wire bundle replacement.

Design features enabling the accomplishment of this object include a bend-reversible wire carrier having opposing beams which define a wire aperture. Advantages associated with the realization of this object include the ability to quickly change wire bundle configuration in response to client request, changing specifications, or changing vehicle function.

It is yet another object of this invention to provide an apparatus and method for carrying wires along a vehicle-mounted extensible mast, which apparatus is field-maintainable. Design features allowing this object to be achieved include a bend-reversible wire carrier which may be removed from its associated masthead platform without removing the masthead platform from the mast, and easily accessible and field-changeable wires in the wire carrier. Benefits associated with reaching this objective include reduced downtime because the equipment can be maintained in the field without having to be returned to the manufacturer, and hence reduced cost and increased system reliability and availability.

It is still another object of this invention to provide an apparatus and method for carrying wires along a vehicle-mounted extensible mast which provides a long-life wire carrier. A design feature enabling the accomplishment of this object is a bend-reversible wire carrier made of long-lasting synthetic material, which is not subject to constant bending stress. Advantages associated with the realization of this object include the economy and reliability associated with a long-life product.

It is another object of this invention to provide an apparatus and method for carrying wires along a vehicle-mounted extensible mast which provides a low-profile vehicle-top apparatus installation. Design features enabling the accomplishment of this object include a bend-reversible wire carrier which neatly folds into a wire carrier box. Advantages associated with the realization of this object include enhanced aesthetic appeal of the invention, along with the ability to use the sides of the wire carrier box for decoration or advertisements.

It is still another object of this invention to provide an apparatus and method for carrying wires along a vehicle-mounted extensible mast which provides a wire carrier which is not subject to tangling or snarling. Design features enabling the accomplishment of this object include a bend-reversible wire carrier whose sections alternately fold clockwise and counterclockwise. Advantages associated with the realization of this object include reduced mast wear and tear, and a neater, more aesthetically pleasing installation and wire-carrier operation.

BRIEF DESCRIPTION OF THE DRAWINGS

The invention, together with the other objects, features, aspects and advantages thereof will be more clearly understood from the following in conjunction with the accompanying drawings.

Seven sheets of drawings are provided. Sheet one contains FIG. 1. Sheet two contains FIG. 2. Sheet three contains FIG. 3. Sheet four contains FIG. 4. Sheet five contains FIG. 5. Sheet 6 contains FIG. 6. Sheet seven contains FIGS. 7 and 8.

DETAILED DESCRIPTION OF THE PREFERRED EMBODIMENT

Figure 2:
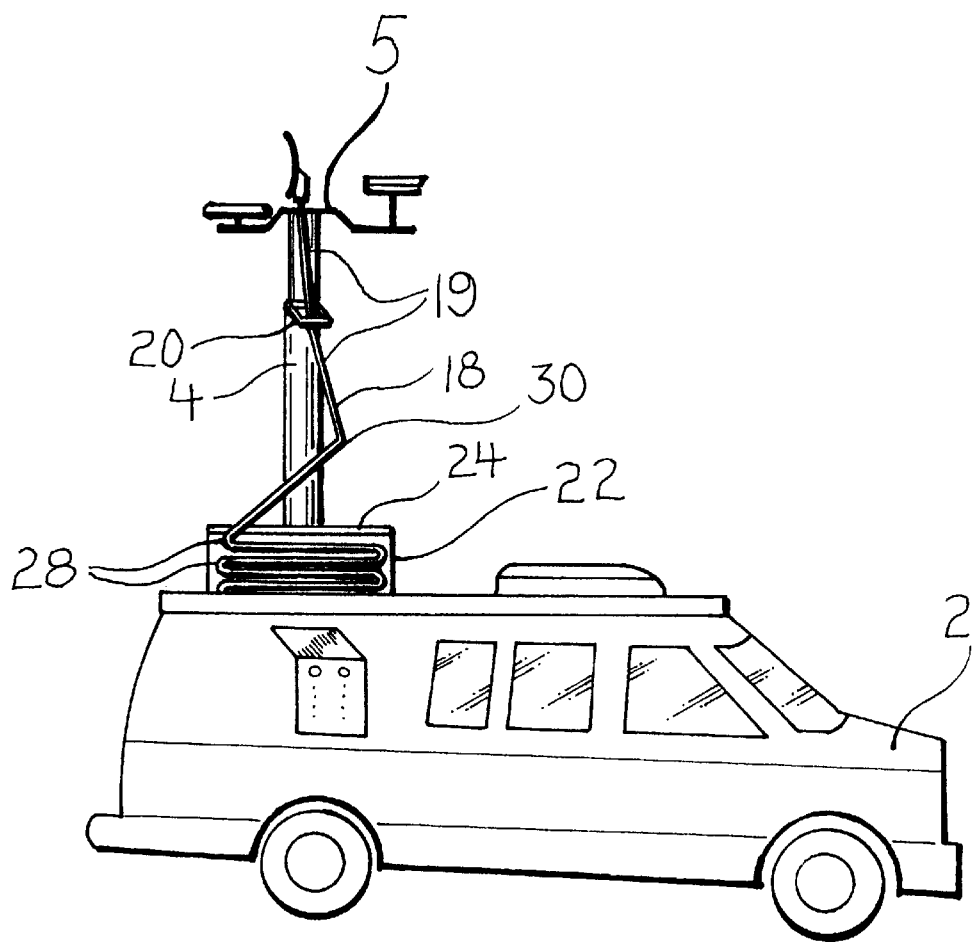
FIG. 2 is a side isometric view of the instant apparatus for carrying wires along a vehicle-mounted extensible mast, with the second and part of the third mast sections extended.

Referring now to FIG. 2 we observe a side isometric view of the instant apparatus for carrying wires along a vehicle-mounted extensible mast. Bend-reversible wire carrier 18 is characterized by clockwise bends 28 alternating with counterclockwise bends 30, separated by bend-reversible wire carrier sections 19. Guides 20 maintain bend-reversible wire carrier 18 in close proximity to mast 4, to prevent bend-reversible wire carrier 18 from whipping around in windy conditions and possibly sustaining damage. Guides 20 also encourage the correct retraction of bend-reversible wire carrier 18 in alternating clockwise bends 28 and counterclockwise bends 30. As mast 4 retracts, bend-reversible wire carrier 18 folds upon itself "accordion" style within wire carrier box 22.

Figure 3:
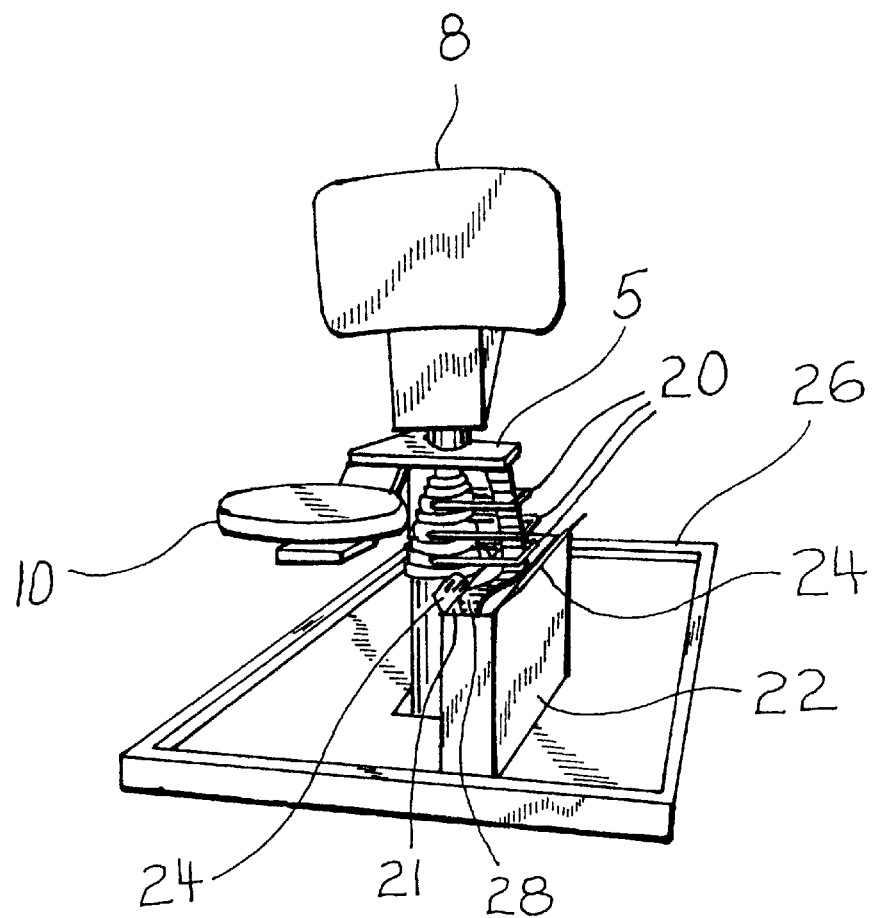
FIG. 3 is a rear isometric view of a vehicle platform.
Figure 7:
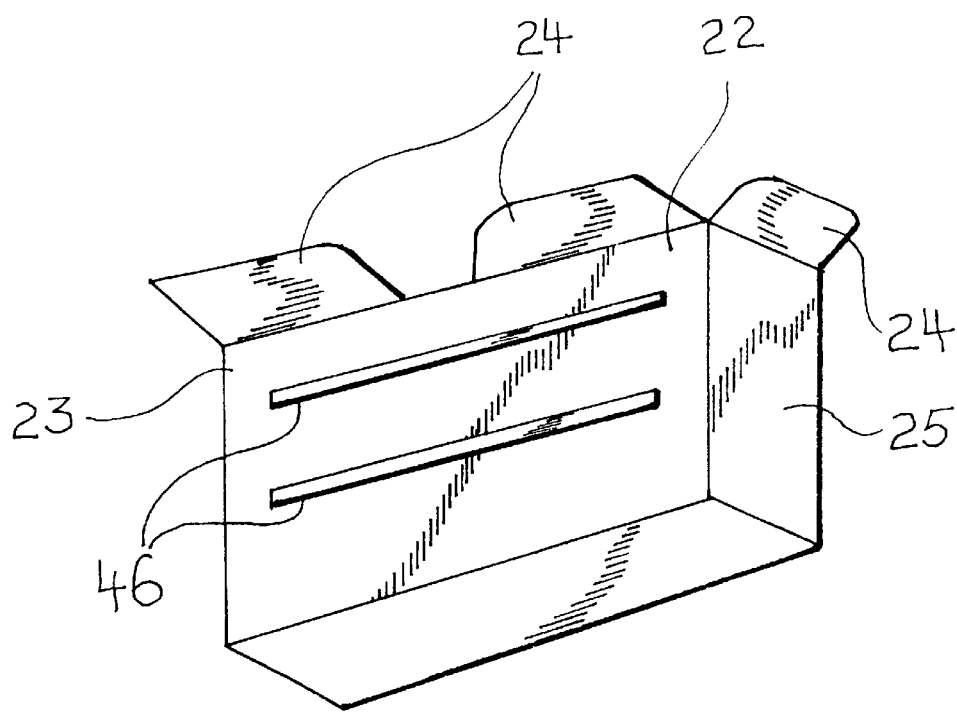
FIG. 7 is a side quarter isometric cut-away view of a wire-carrier box with heating strips.

As may be also seen in FIGS. 3 and 7, wire carrier box 22 comprises wire carrier box lips 24 which guide bend-reversible wire carrier 18 through wire carrier box aperture 21 into wire carrier box 22 for storage. Wire carrier box aperture 21 is defined by the intersection of wire carrier box lips 24 and wire carrier box side walls 23, and wire carrier box end walls 25. Wire carrier box lips 24 are rigidly attached to opposite wire carrier box side walls 23 at an angle of 30°±20° relative to their respective wire carrier box side walls 23, leaning away from each other, and to their respective wire carrier box end walls 25, leaning away from each other.

FIG. 7 is a side quarter isometric cut-away view of wire carrier box 22 with heater strips 46 attached to its inside. In cold weather, ice and snow can accumulate within wire carrier box 22, inhibiting the operation of the instant apparatus. Under such conditions, heater strips 46 serve to melt the ice and snow, allowing bend-reversible wire carrier 18 to extend and retract normally. Heater strips 46 may be conventional electric heating strips comprising conventional electrical-resistance heating elements, or other appropriate heater strip.

Figure 4:
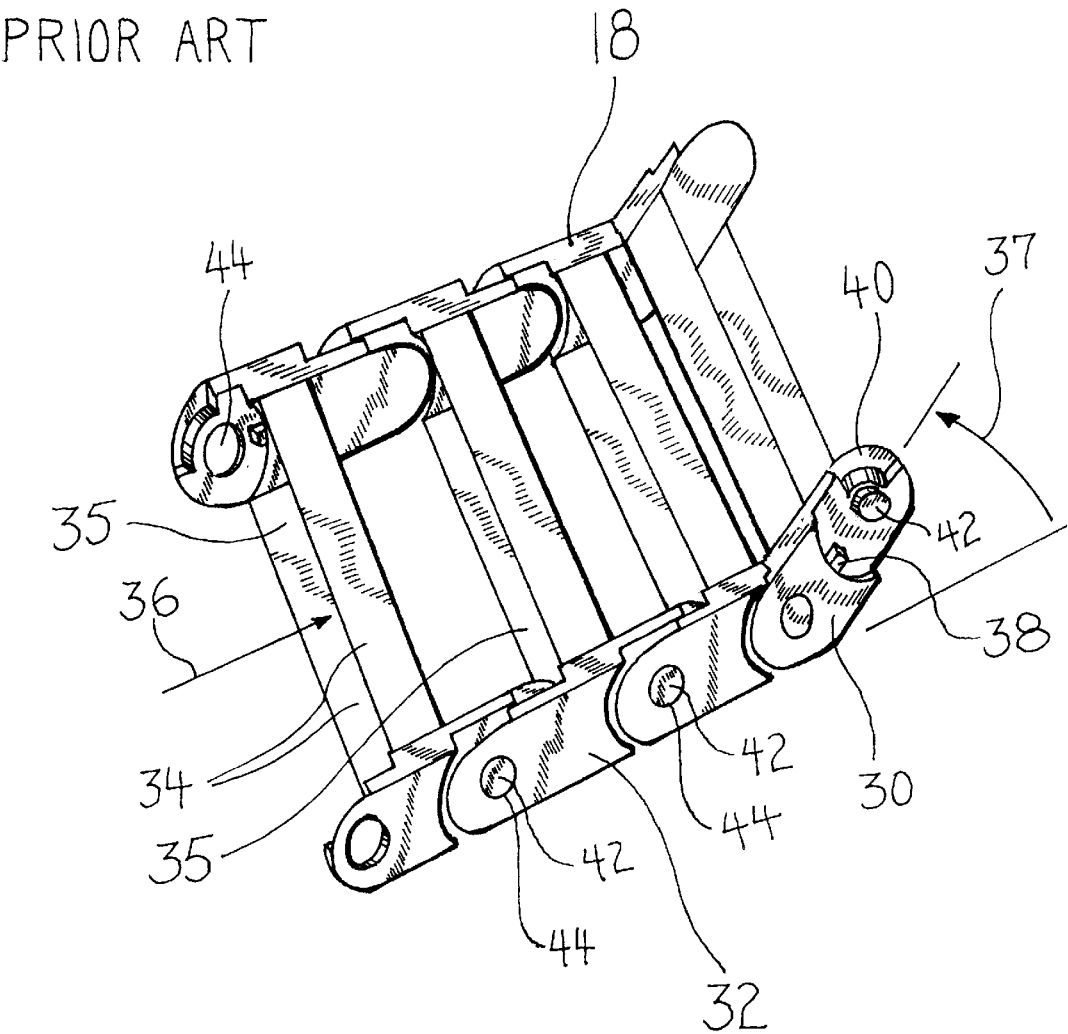
FIG. 4 is a side quarter elevated isometric view of a currently available bend-reversible wire carrier.

FIG. 4 is a side quarter elevated isometric view of a currently available bend-reversible wire carrier 18. This figure is intended to illustrate only one possible embodiment of bend-reversible wire carrier 18; any bend-reversible wire carrier 18 may be employed for the purposes of the instant invention as long as such bend-reversible wire carrier 18 provides clockwise bends 28 alternating with counterclockwise bends 30 separated by bend-reversible wire carrier sections 19.

The bend-reversible wire carrier 18 example depicted in FIG. 4 comprises a series of links 32 rotatably attached to each other by means of posts 42 of one link 32 disposed within post bores 44 of an adjacent link 32. In the instant case, all links 32 depicted are mutually attached so as to provide counterclockwise bends 30, as illustrated by arrow 37.

Each link 32 comprises a tab race 40 sized to admit a tab 38 of an adjacent link 32. Tab races 40 constrain the rotational motion of adjacent links 32 to an arc of approximately 60° extending either from 0° to 60° clockwise bend, or from 0° to 60° counterclockwise bend, where 0° refers to zero bend. The direction of bend (clockwise or counterclockwise) may be changed by simply unsnapping a given link 32 from its neighbor by prying its posts 42 from its neighbor's post bores 44, flipping it over, and snapping its posts 42 into the opposite post bores 44 which they previously occupied. If a 180° clockwise bend 28 is desired, three links 32 can simply be snapped together so as to produce three consecutive 60° clockwise bends 28, thus providing a 180° clockwise bend over three links 32.

Thus, the bend-reversible wire carrier 18 illustrated in FIG. 4 can be configured to comprise clockwise bends 28 alternating with counterclockwise bends 30, separated by bend-reversible wire carrier sections 19. The length of bend-reversible wire carrier sections 19 is determined by the number of its links 32, and is set to coincide with the dimensions of wire carrier box 22, as may be observed in FIG. 2. FIG. 2 includes a cut-away view of wire carrier box 22 containing most of bend-reversible wire carrier 18 in an "accordion" folded configuration.

The bend-reversible wire carrier 18 illustrated in FIG. 4 comprises links 32 which have opposing pairs of beams 34, which define wire apertures 35. In practice, the bend/bend-reversible wire carrier section 19 configuration is established by snapping the appropriate links 32 together, and then wire is loaded into bend-reversible wire carrier 18 as depicted by arrow 36.

Figure 1:
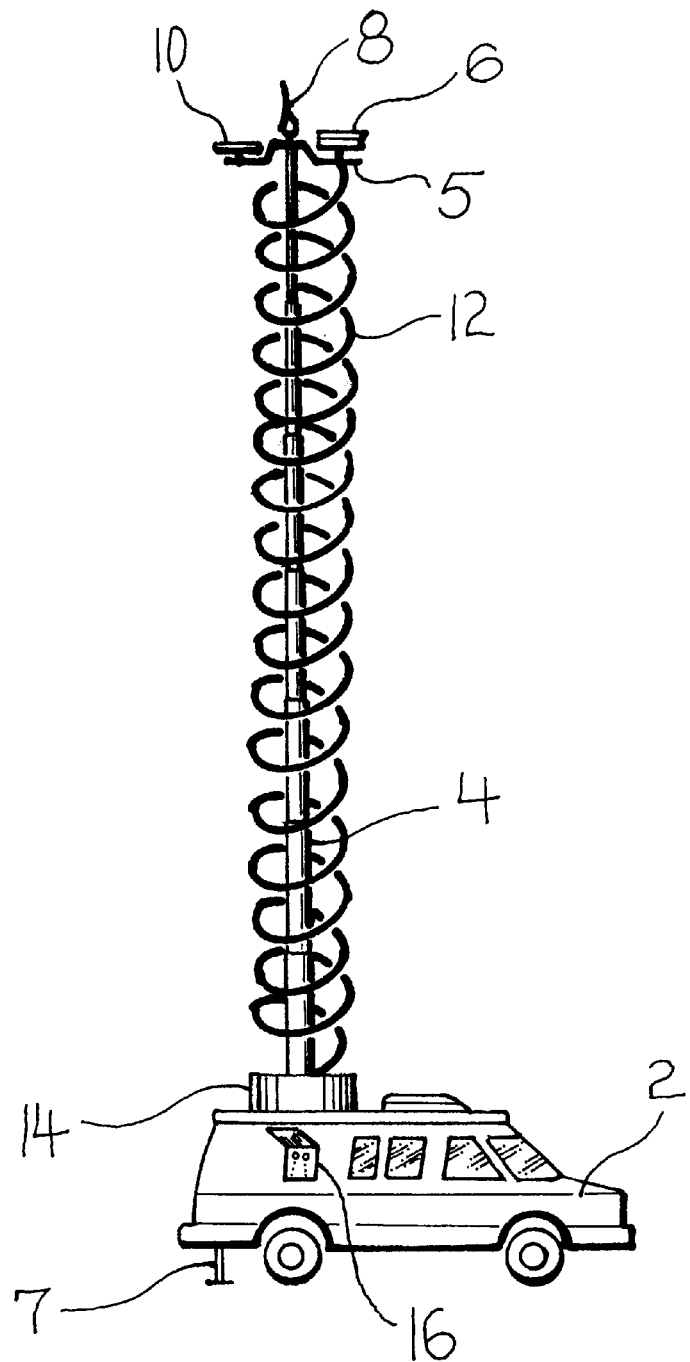
FIG. 1 is a side isometric view of a prior art apparatus for carrying wires along a vehicle-mounted extensible mast.

It is important to note that there is no need to stuff all wires into bend-reversible wire carrier 18 simultaneously, accompanied by large amounts of soapy wire-pulling lubricant, as in the currently available coiled tube 12 systems (such as the one depicted in FIG. 1). Rather, wires may be laid into bend-reversible wire carrier 18 collectively or individually, as most suits the situation. In a field maintenance situation, one faulty wire can be removed from bend-reversible wire carrier 18 and replaced with a fresh one, without having to disturb the rest of the wire bundle. This capability represents a major advance in field serviceability, and hence in the reduction of down-time, of systems for carrying wires along a vehicle-mounted extensible mast.

Figure 5:
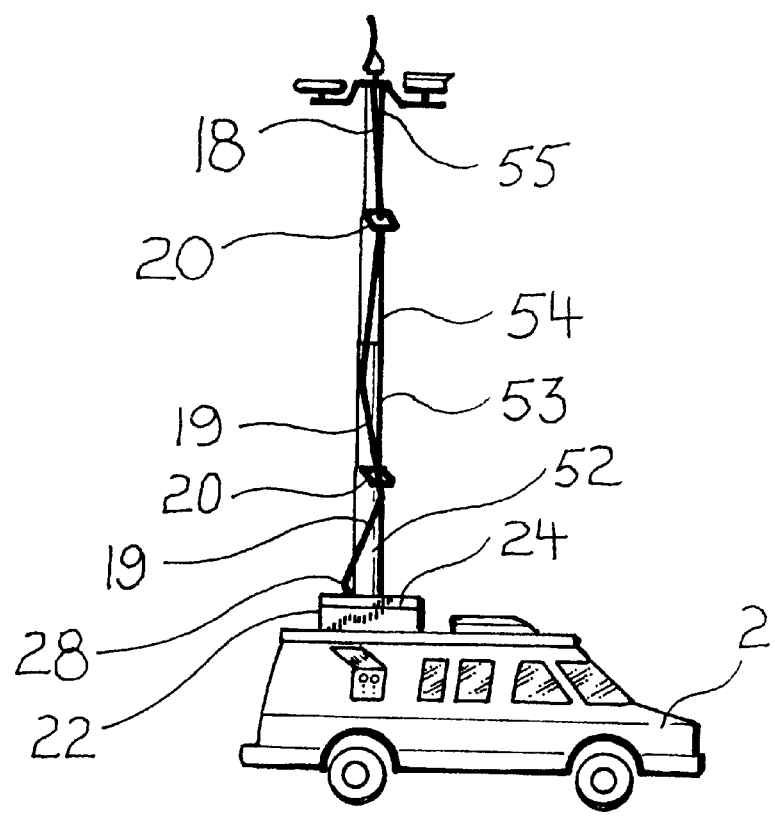
FIG. 5 is a side isometric view of an apparatus for carrying wires along a vehicle-mounted extensible mast, with the second, third, fourth and fifth mast sections extended.
Figure 6:
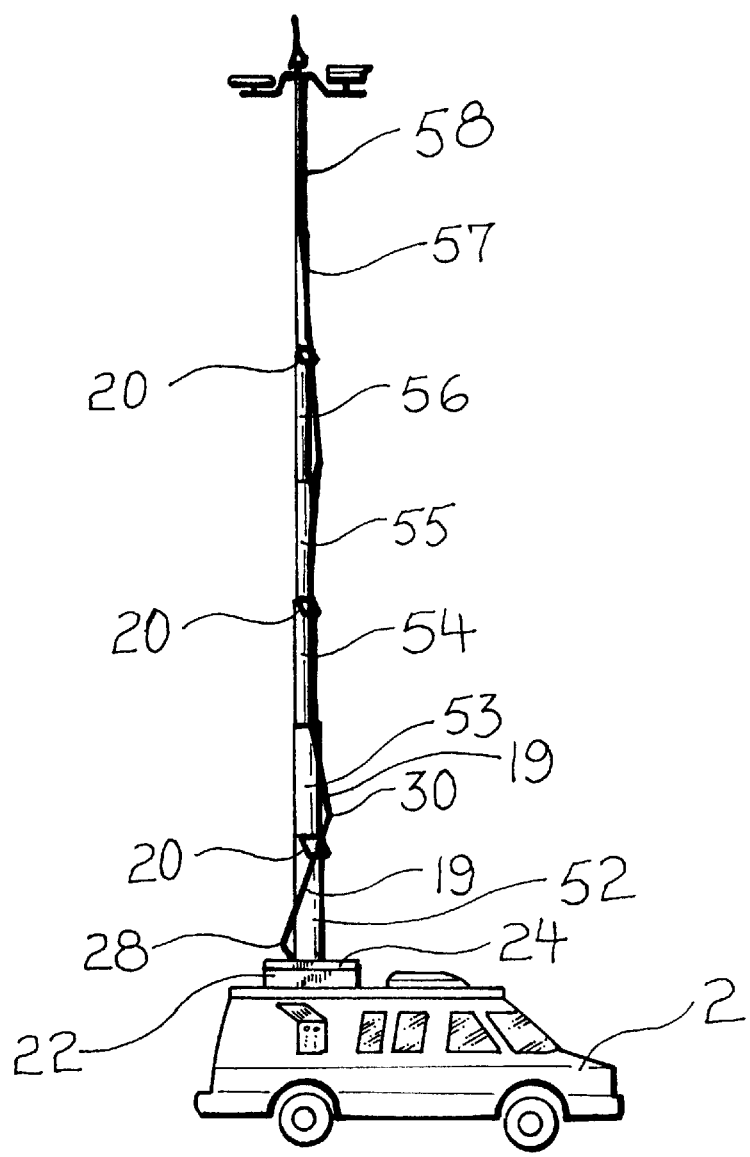
FIG. 6 is a side isometric view of an apparatus for carrying wires along a vehicle-mounted extensible mast, with mast sections 2–8 extended.

FIGS. 2, 5 and 6 depict the progressive extension of mast 4 using the instant system. FIG. 2 is a side isometric view of the instant apparatus for carrying wires along a vehicle-mounted extensible mast, with second mast section 52 and part of the third mast section 53 extended. FIG. 5 is a side isometric view of an apparatus for carrying wires along a vehicle-mounted extensible mast, with second mast section 52, third mast section 53, fourth mast section 54, and fifth mast section 55 extended. FIG. 6 is a side isometric view of an apparatus for carrying wires along a vehicle-mounted extensible mast, with second mast section 52, third mast section 53, fourth mast section 54, fifth mast section 55, sixth mast section 56, seventh mast section 57, and eighth mast section 58 extended. The first mast section is securely attached to vehicle 2 and is disposed within vehicle 2, and is thus not visible.

As mast 4 extends, sequential bend-reversible wire carrier sections 19 unfold from their stored position within wire carrier box 22, alternatingly unfolding from clockwise bends 28 and counterclockwise bends 30. As mast 4 extends, guides 20 maintain bend-reversible wire carrier 18 in close proximity to mast 4. In the embodiment depicted in these figures, a guide 20 is attached to the tops of second mast section 52, fourth mast section 54, and sixth mast section 56.

FIGS. 2, 5 and 6 taken in reverse numerical order depict mast 4 being retracted. In FIG. 6, as mast 4 retraction commences, bend-reversible wire carrier 18 starts its "accordion" folding into wire carrier box 22 by means of a clockwise bend 28. Gravity pulls bend-reversible wire carrier 18 into wire carrier box 22 as depicted, and guides 20 assist bend-reversible wire carrier 18 in retaining its alignment with wire carrier box 22, and in making the appropriate bends. Wire carrier box lips 24 form a species of funnel to also assist in guiding bend-reversible wire carrier 18 through wire carrier box aperture 21 into wire carrier box 22.

In FIG. 5, mast 4 is approximately halfway retracted, and bend-reversible wire carrier 18 continues its "accordion" folding into wire carrier box 22 by means of another clockwise bend 28. As bend-reversible wire carrier 18 "accordion" folds into wire carrier box 22, bend-reversible wire carrier 18 is constrained in its stored position by means of wire carrier box side walls 23 and wire carrier box end walls 25.

Figure 8:
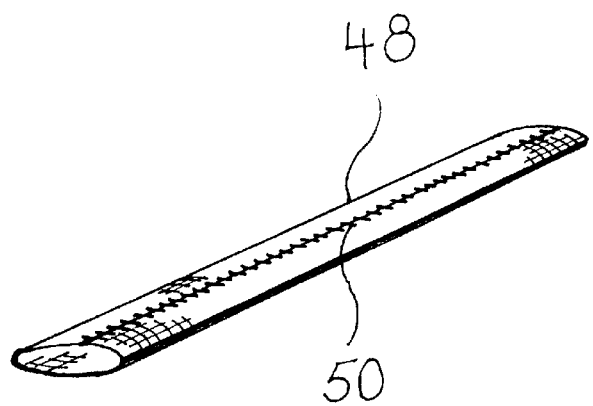
FIG. 8 is a side quarter isometric view of a reversible wire-carrier cover.

Wires disposed within bend-reversible wire carrier 18 may suffer damage from ultraviolet rays over time. In addition, in cold climates, accumulated snow and ice may interfere with the rotational motion of mutually adjacent links 32. To prevent these problems, bend-reversible wire carrier 18 may be sheathed in a cover 48 as is depicted in FIG. 8. Cover 48 may be a continuous tube which is simply slipped onto bend-reversible wire carrier 18 like a sock onto a foot, or may comprise a cover closure 50. Cover closure 50 may be a zipper, mutually cooperating strips of hood and loop material, or other appropriate closure. If cover 48 is equipped with a cover closure 50, then bend-reversible wire carrier 18 is simply laid into cover 48, and then cover closure 50 is used to securely fasten cover 48 around bend-reversible wire carrier 18. Cover 48 may be made of synthetic material such as nylon, fabric, canvas, or other appropriate material.

While a preferred embodiment of the invention has been illustrated herein, it is to be understood that changes and variations may be made by those skilled in the art without departing from the spirit of the appending claims. For example, although a wheeled land vehicle is disclosed herein, it is contemplated the instant invention could be used with any vehicle, including boats, aircraft, etc.

DRAWING ITEM INDEX 2 vehicle
4 mast
5 masthead platform
6 camera
7 extensible jack
8 microwave dish antenna
10 RF pancake antenna
12 coiled tube
14 basket
16 control panel
18 bend-reversible wire carrier
19 bend-reversible wire carrier section
20 guide
21 wire carrier box aperture
22 wire carrier box
23 wire carrier box side wall
24 wire carrier box lip
25 wire carrier box end wall
26 vehicle platform
28 clockwise bend
30 counterclockwise bend
32 link
34 beam
35 wire aperture
36 arrow
37 arrow
38 tab
40 tab race
42 post
44 post bore
46 heater strip
48 cover
50 cover closure
52 second mast section
53 third mast section
54 fourth mast section
55 fifth mast section
56 sixth mast section
57 seventh mast section
58 eighth mast section

I claim:

1. An apparatus for carrying wires along a vehicle-mounted extensible mast comprising an extensible mast and a wire carrier box mounted to a vehicle, a masthead platform mounted to an extreme of said mast opposite said vehicle, and a bend-reversible wire carrier, one extreme of said bend-reversible wire carrier being attached to said vehicle, and an opposite extreme of said bend-reversible wire carrier being attached to said masthead platform, said bend-reversible wire carrier comprising clockwise bends alternating with counterclockwise bends separated by bend-reversible wire carrier sections, said bend-reversible wire carrier sections, said clockwise bends, and said counterclockwise bends being sized to fit into said wire carrier box, each said clockwise bend being a part of said bend-reversible wire carrier capable of bending through an arc ranging from 0° to 180° in the clockwise direction, each said counterclockwise bend being a part of said bend-reversible wire carrier capable of bending through an arc ranging from 0° to 180° in the counterclockwise direction, said wire carrier box comprising opposite wire carrier box end walls, said wire carrier box end walls being sized to admit, said-reversible wire carrier when said bend-reversible wire carrier is in an "accordion" folded configuration, and at least one guide attached to said extensible mast, said at least one guide being sized to admit said bend-reversible wire carrier, whereby said bend-reversible wire carrier may be maintained in close proximity with said mast.

2. The apparatus for carrying wires along a vehicle-mounted extensible mast of claim 1 wherein said wire carrier box further comprises wire carrier box lips attached to opposite wire carrier side walls at an angle of 30°±20° relative to their respective wire carrier box side walls, said wire carrier box lips leaning away from each other.

3. The apparatus for carrying wires along a vehicle-mounted extensible mast of claim 2 further comprising wire carrier box lips attached to opposite wire carrier box end walls at an angle of 30°±20° relative to their respective wire carrier box end walls, said wire carrier box lips leaning away from each other.

4. The apparatus for carrying wires along a vehicle-mounted extensible mast of claim 2 wherein said bend-reversible wire carrier is comprised of links, each said link being rotatably attached to an adjacent said link by means of posts in post bores, each said link comprising a wire aperture sized to admit a wire bundle, rotation of each link relative to its adjacent link being limited by tabs reciprocating within tab races.

5. The apparatus for carrying wires along a vehicle-mounted extensible mast of claim 4 wherein said links are removably attached to each other so as to vary a bend direction between adjacent links from clockwise to counterclockwise and back.

6. The apparatus for carrying wires along a vehicle-mounted extensible mast of claim 5 wherein rotation of each said link relative to an adjacent link is limited to 0° to 60° in the clockwise direction, or alternately to 0° to 60° in the counterclockwise direction.

7. The apparatus for carrying wires along a vehicle-mounted extensible mast of claim 2 further comprising a cover around said bend-reversible wire carrier, whereby said bend-reversible wire carrier and any wires disposed therein may be protected from inclement weather and ultraviolet rays.

8. The apparatus for carrying wires along a vehicle-mounted extensible mast of claim 7 wherein said cover comprises a longitudinally disposed cover closure, whereby said bend-reversible wire carrier may be laid in said cover, and said cover subsequently securely attached around said bend-reversible wire carrier.

9. The apparatus for carrying wires along a vehicle-mounted extensible mast of claim 2 wherein said wire carrier box comprises a means of heating its contents, so as to be able to melt ice and snow accumulations.

10. The apparatus for carrying wires along a vehicle-mounted extensible mast of claim 9 wherein said heating means comprises at least one electrical heating strip disposed on an inner surface of said wire carrier box.

11. An apparatus for carrying wires along a vehicle-mounted extensible mast comprising an extensible mast and a wire carrier box mounted to a vehicle, and a bend-reversible wire carrier, one extreme of said bend-reversible wire carrier being attached to said vehicle, and an opposite extreme of said bend-reversible wire carrier being attached to an extreme of said mast opposite said vehicle, said bend-reversible wire carrier comprising clockwise bends alternating with counterclockwise bends separated by bend-reversible wire carrier sections, said bend-reversible wire carrier sections, said clockwise bends, and said counterclockwise bends being sized to fit into said wire carrier box, said mast being telescopically extensible, and comprising a plurality of mutually extensible mast sections, and at least one guide attached to said extensible mast, said at least one guide being sized to admit said bend-reversible wire carrier, whereby said bend-reversible wire carrier may be maintained in close proximity with said mast.

12. The apparatus for carrying wires along a vehicle-mounted extensible mast of claim 11 wherein said mast comprises eight said mast sections, a first said mast section being attached to said vehicle, one each said guide being attached to a second mast section, a fourth mast section, and to a sixth mast section.

13. A method for carrying wires along a vehicle-mounted extensible mast using an apparatus for carrying wires along a vehicle-mounted extensible mast, said apparatus comprising an extensible mast and a wire carrier box mounted to a vehicle, a masthead platform mounted to an extreme of said mast opposite said vehicle, a bend-reversible wire carrier, and at least one guide attached to said mast, said bend-reversible wire carrier being threaded through said guide, one extreme of said bend-reversible wire carrier being attached to said vehicle, and an opposite extreme of said bend-reversible wire carrier being attached to said masthead platform, said bend-reversible wire carrier comprising clockwise bends alternating with counterclockwise bends separated by bend-reversible wire carrier sections, said bend-reversible wire carrier sections, said clockwise bends, and said counterclockwise bends being sized to fit into said wire carrier box, said method comprising the steps of:

A. Sizing said bend-reversible wire carrier sections, said bend-reversible wire carrier sections, said clockwise bends, and said counterclockwise bends to fit into said wire carrier box;

B. Laying wire into said bend-reversible wire carrier;

C. Attaching one extreme of said bend-reversible wire carrier to said vehicle;

D. Threading said bend-reversible wire carrier through said at least one guide;

E. Attaching an extreme of said bend-reversible wire carrier opposite said vehicle to said masthead platform; and F. Extending and retracting said mast as desired, said bend-reversible wire carrier being disposed within said wire carrier box when said mast is retracted.

* * * * *